United States Patent
Poczik et al.

(10) Patent No.: US 8,845,133 B2
(45) Date of Patent: Sep. 30, 2014

(54) THERMAL BARRIER AND PARTS FIXING IN COMPACT FLUORESCENT LAMPS

(75) Inventors: Peter Ivan Poczik, Budapest (HU); Laszlo Bankuti, Budapest (HU); Karoly Talosi, Nagykanizsa (HU); Peter Mora, Budapest (HU)

(73) Assignee: General Electric Company, Schenectady, NY (US)

(*) Notice: Subject to any disclaimer, the term of this patent is extended or adjusted under 35 U.S.C. 154(b) by 218 days.

(21) Appl. No.: 13/191,669

(22) Filed: Jul. 27, 2011

(65) Prior Publication Data
US 2013/0026913 A1    Jan. 31, 2013

(51) Int. Cl.
*F21V 23/00* (2006.01)
*H01J 61/52* (2006.01)
*H05B 35/00* (2006.01)

(52) U.S. Cl.
CPC ............... *H01J 61/523* (2013.01); *Y02B 20/19* (2013.01); *H05B 35/00* (2013.01)
USPC ........... 362/260; 362/216; 362/228; 362/650; 313/47

(58) Field of Classification Search
CPC ............... H01R 33/08; H01R 33/0818; H01R 33/0836; H01R 33/0854; H01R 33/0863; H01R 33/0872; F21V 19/006; F21V 19/0075; F21Y 2113/00; F21Y 2113/02; H01J 17/28; H01J 61/04; H01J 61/10; H01J 61/103
USPC ............ 362/228, 249.01, 235, 263–265, 647, 362/649, 650, 294, 373, 216, 260, 267; 313/45–47, 218.12, 627, 634, 318.12; 445/23; 315/32
See application file for complete search history.

(56) References Cited

U.S. PATENT DOCUMENTS

| 5,015,671 A * | 5/1991 | Ono et al. ..................... 523/402 |
| 5,751,105 A | 5/1998 | Cserteg et al. |
| 2005/0023947 A1 | 2/2005 | Tsuneto et al. |
| 2010/0181911 A1* | 7/2010 | Fulop et al. ..................... 315/51 |

FOREIGN PATENT DOCUMENTS

| JP | 2000200582 A | 7/2000 |
| JP | 2009164072 A | 7/2009 |

OTHER PUBLICATIONS

PCT Search Report and Written Opinion dated Oct. 10, 2012 from corresponding Application No. PCT/US2012/046609.

* cited by examiner

Primary Examiner — Thomas Sember
(74) Attorney, Agent, or Firm — Fay Sharpe LLP

(57) ABSTRACT

A compact fluorescent lamp (CFL) including an insulating barrier between heat sources and heat sensitive components. The heat sensitive barrier is in the form of an insulative layer of cement applied between the heat generating components of the CFL and one or more heat sensitive components of the CFL. The cement can also fix or secure various components within the lamp thereby eliminating the need for some or all of the support structure of a conventional CFL.

14 Claims, 5 Drawing Sheets

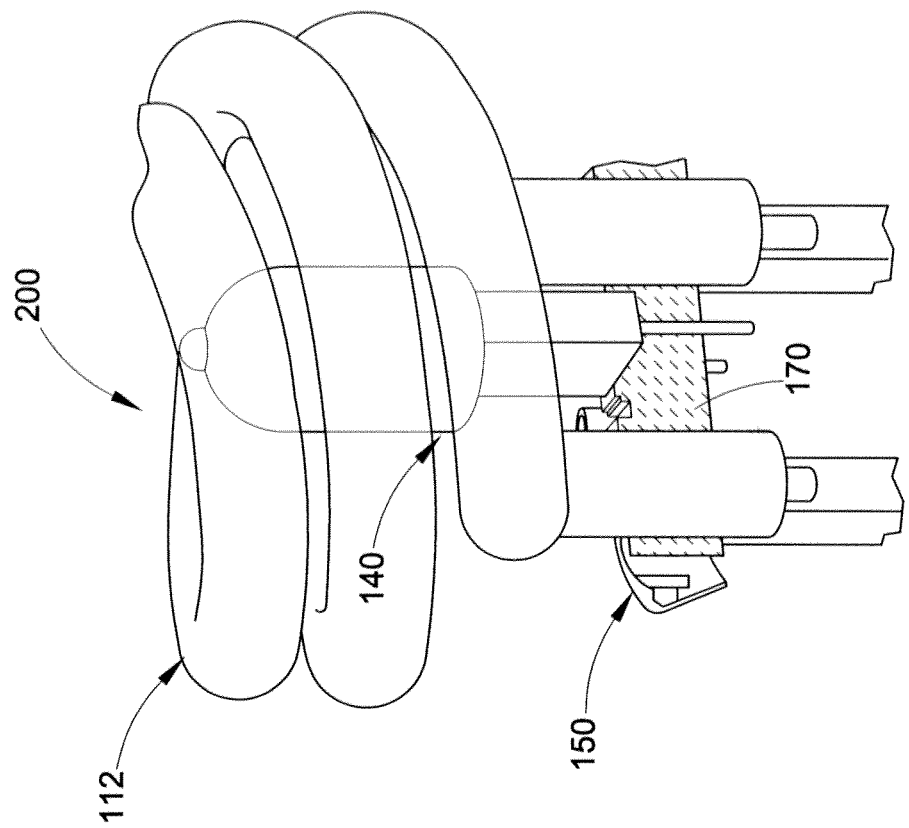
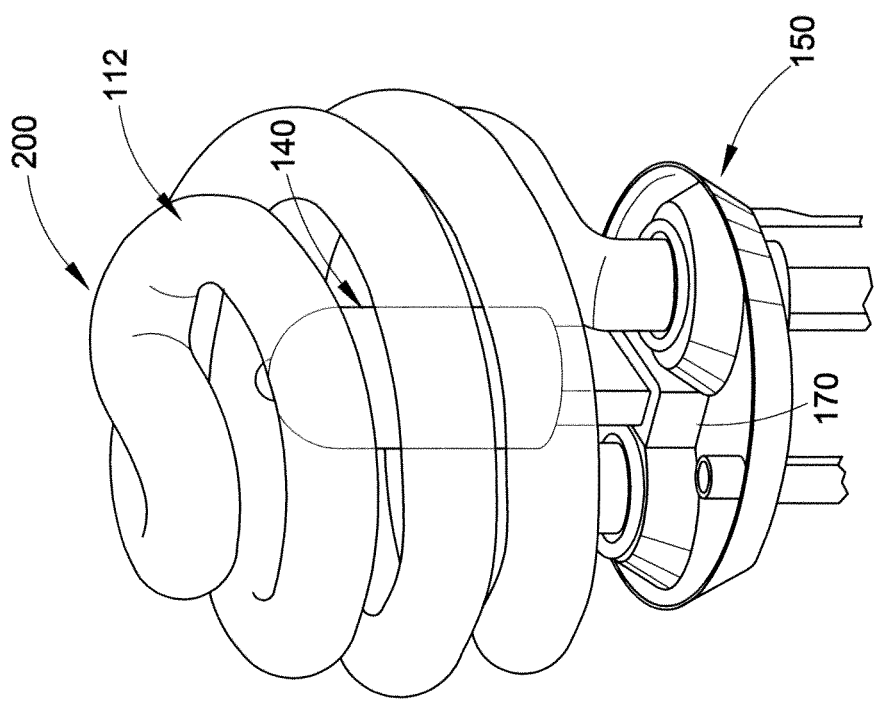

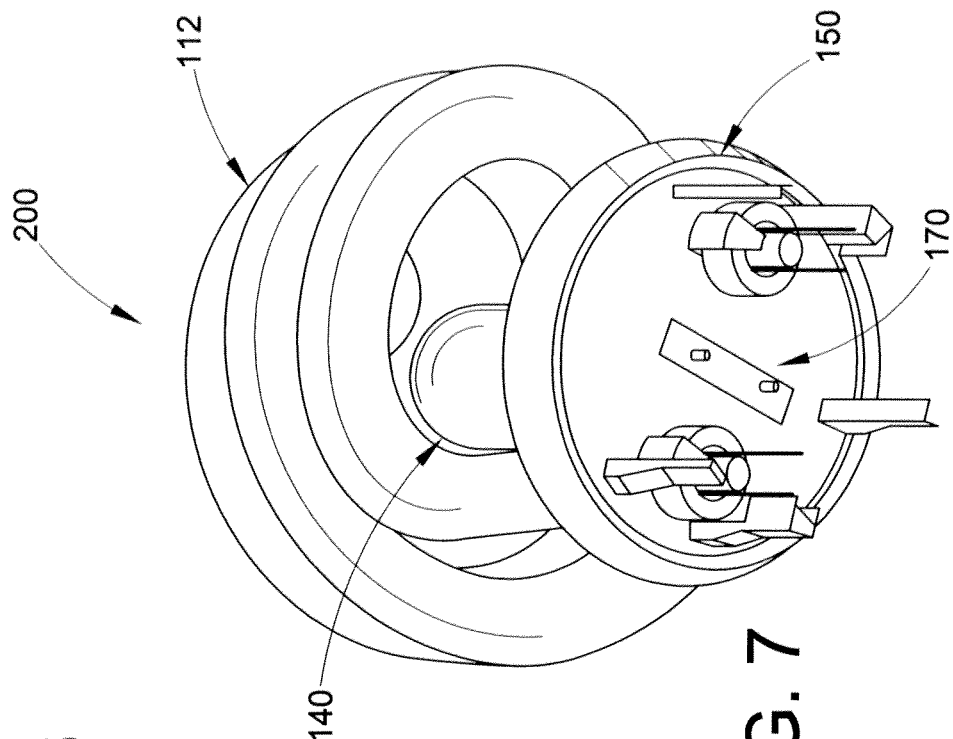
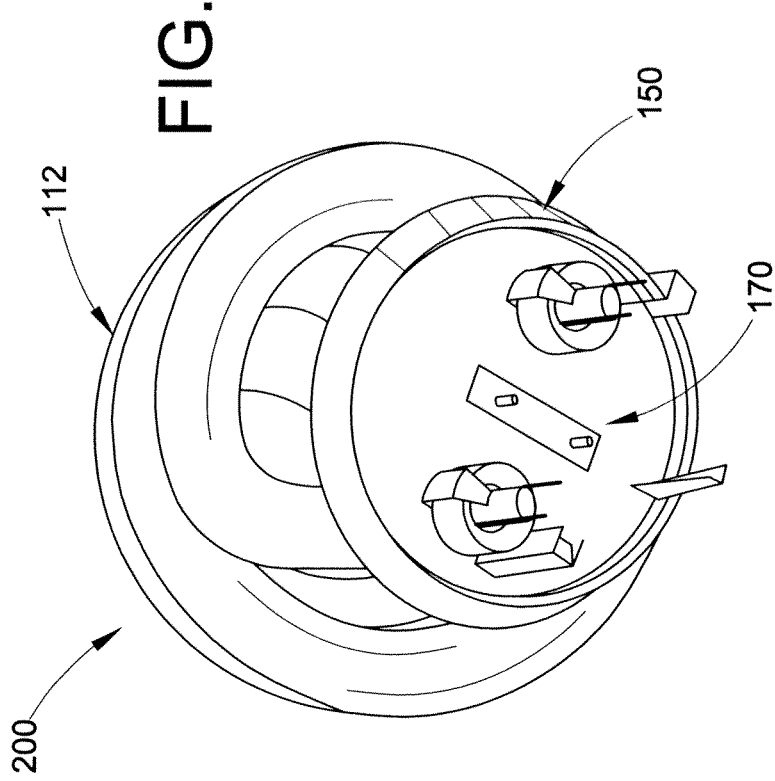

THERMAL BARRIER AND PARTS FIXING IN COMPACT FLUORESCENT LAMPS

BACKGROUND OF THE DISCLOSURE

This disclosure is directed to a lamp assembly, and particularly a lamp assembly that provides energy savings. More specifically, the lamp assembly has an insulating barrier between heat sources and heat sensitive components.

Compact fluorescent lamps (CFLs) have become increasingly popular due to the potential energy savings they offer as compared to incandescent light bulbs. The cost of CFL's, however, is still greater than a typical incandescent light bulb. Additionally, CFLs often have a lengthy run-up, or time required to reach full light output, as compared to incandescent light bulbs.

A number of different solutions currently exist to improve run-up behavior, i.e., reducing the time to full light associated with starting or igniting fluorescent lamps. By way of example only, long-life compact fluorescent lamps need approximately 0.5 to 1.5 seconds to preheat the cathodes or electrodes before starting. Before preheating is complete, there is no light emission from the lamp. Once the arc discharge is initiated, the compact fluorescent lamp (CFL) still requires an additional approximately 20 to 120 seconds or more to reach full light output.

Prior arrangements have attempted to reduce the run-up time of a CFL that uses amalgam mercury dosing by incorporating an auxiliary amalgam close to one of the electrodes in the lamp. As a result of this arrangement, mercury stored in the auxiliary amalgam is vaporized shortly after switching on. In this way, the run-up period is reduced, although this proposed solution does not provide an instant light feature. Another proposed solution combines two lamps in one unit. More particularly, a compact fluorescent lamp and a conventional incandescent lamp are combined. In some units both lamps are simultaneously turned on in order to result in instant light from the incandescent lamp, and then subsequently the incandescent lamp is switched off.

Regardless of the type of CFL, both the compact fluorescent lamp and conventional incandescent lamp represent significant heat sources. The heat generated by these components can potentially damage other lamp parts such as plastic components, heat-sensitive electronics, etc. and lead to lamp failure. In the past, heat resistant materials such as ceramic plates and/or heat-resistant plastic composite insulating elements or holders have been used to shield heat-sensitive components from exposure to the heat generating components. These prior solutions, however, are generally expensive and therefore raise the cost of producing a CFL.

SUMMARY OF THE DISCLOSURE

A CFL including an insulating barrier between heat sources and heat sensitive components. The heat sensitive barrier is in the form of an insulative layer of cement applied between the heat generating components of the CFL and one or more heat sensitive components of the CFL. The cement can also fix or secure various components within the lamp thereby eliminating the need for some or all of the support structure of a conventional CFL.

In accordance with one aspect, a lamp assembly comprises a lamp base having a compartment, a lamp source mounted to the lamp base, a power control module received in the lamp base compartment and operatively connected to the lamp source, and an insulative cement layer between the lamp source and the power control module, the insulative layer operative to insulate the power control module from heat generated by the lamp source. A shield may extend between at least a portion of the lamp base and the lamp source. The insulative cement layer can be in contact with said shield, and/or can be supported by the shield.

The insulative cement layer can at least partially surround abuse portion of the lamp source thereby securing the lamp source in position. The insulative cement layer includes polymers (polyalkylsiloxane or other silicone based resin) with organic and inorganic additives. The insulative cement layer can include an amount of heat-resistant material doped (combined) with ceramic powders (fine grain ceramic beads, spheres, etc.) for increasing the insulative properties of the cement layer. The insulative cement layer can have a thickness between about 1-10 mm, for example. In one embodiment, the thickness of the insulative cement layer can be approximately 3 mm.

The lamp source of the lamp assembly can include a fluorescent lamp source. An incandescent lamp source can also be mounted to the lamp base and disposed adjacent the fluorescent lamp source. The lamp base can include a threaded region for associated receipt in an associated threaded lamp socket.

In accordance with another aspect, the method of assembling a lamp comprises providing a lamp base, mounting a fluorescent lamp source to the lamp base, positioning an incandescent lamp source adjacent the fluorescent lamp source, connecting the fluorescent lamp source and the incandescent lamp source to a power control module for selectively terminating power to the incandescent lamp source in response to the sensor detecting a predetermined temperature of the fluorescent lamp source, and flowing an insulative layer of cement between the lamp sources and the power control module for fixing the lamp sources in place and insulating the power control module from heat generated by the lamp sources.

The method can further comprise separating the power control module from the lamp sources with a barrier wall. The separating step can include allowing legs of the lamp sources to extend through the barrier wall and insulative cement layer for connection with the power control module.

BRIEF DESCRIPTION OF THE DRAWINGS

FIG. 4 is a perspective view of the lamp assembly of FIG. 3.

FIG. 5 is another perspective view of the lamp assembly of FIG. 3, enlarged with portions thereof in cross-section.

FIG. 6 is a perspective view of an underside of an exemplary lamp construction.

FIG. 7 is a perspective view of an underside of another exemplary lamp construction.

DETAILED DESCRIPTION OF THE PREFERRED EMBODIMENTS

Figure 1:
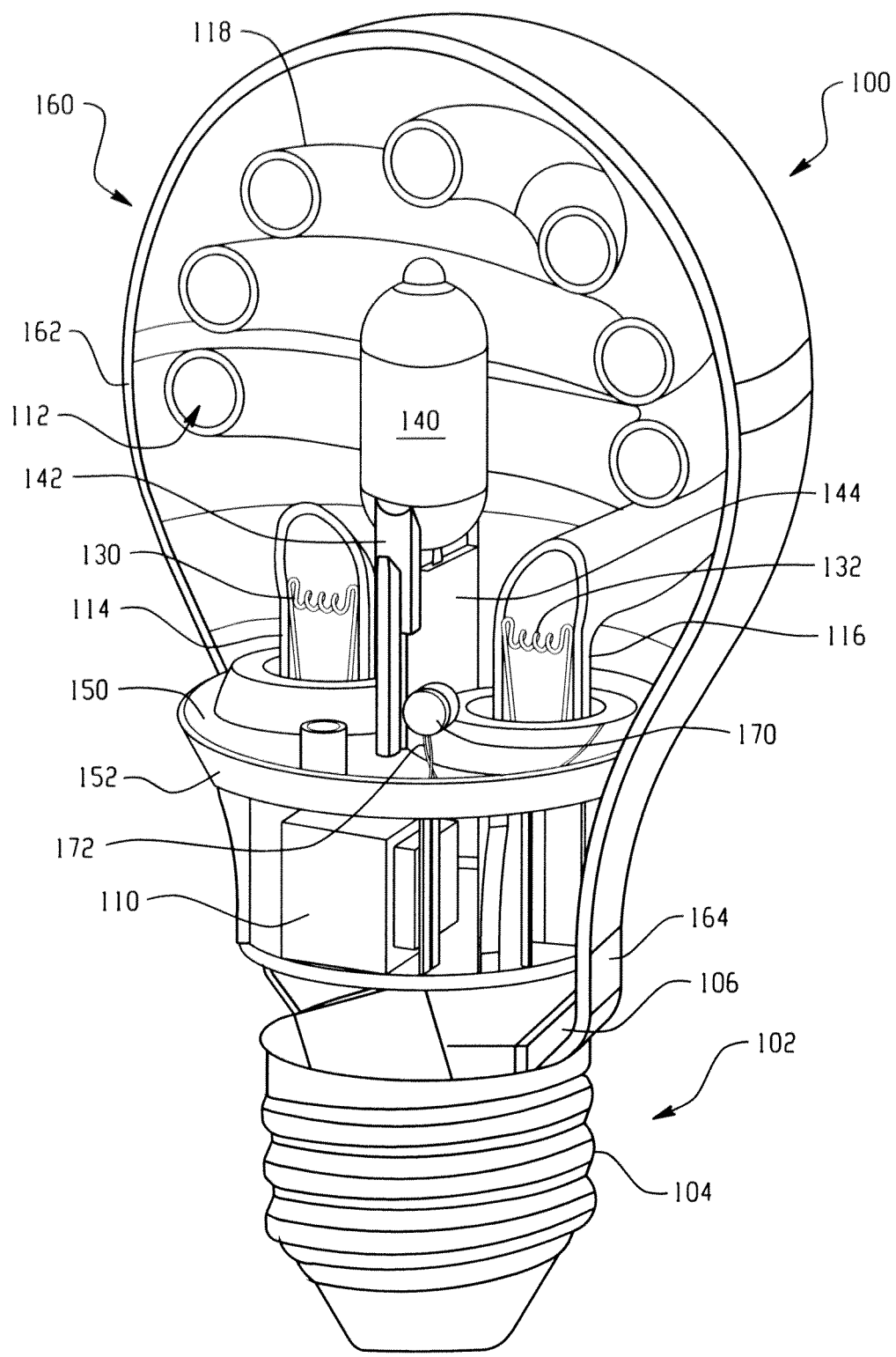
FIG. 1 is an elevational view of a lamp assembly, with portions of the bulb and fluorescent lamp source in cross-section.
Figure 2:
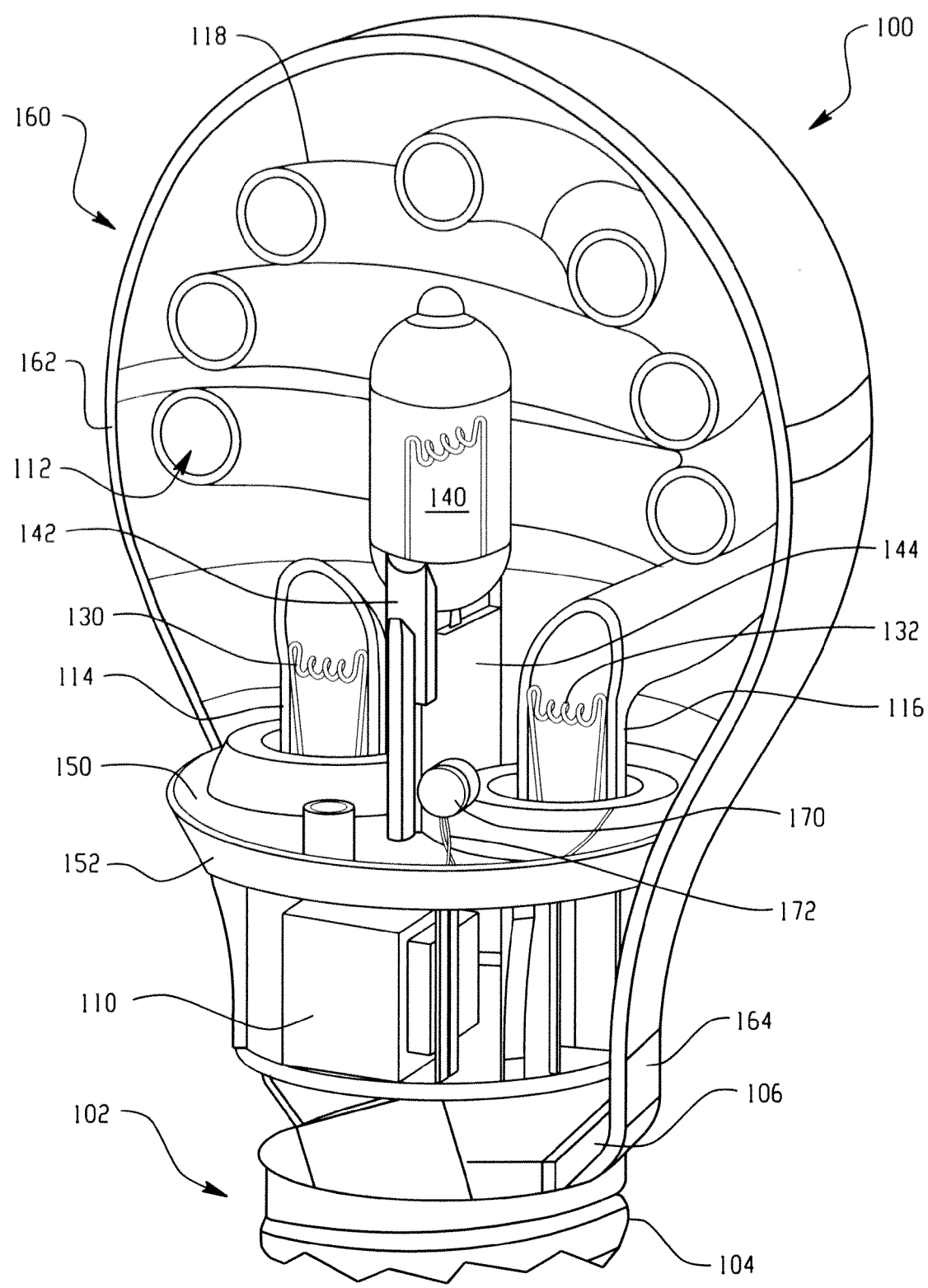
FIG. 2 is an enlarged view of the lamp assembly of FIG. 1 shown in cross-section.

FIGS. 1 and 2 show a lamp assembly, and more particularly a compact fluorescent lamp assembly 100 that is generally referred to as an energy saving lamp or light source that advantageously provides instant light and fast warm-up. A lamp base 102 includes a mechanical and electrical arrangement for receipt in an associated lamp socket (not shown) to mechanically support the lamp assembly 100 and provide power to operate the lamp assembly. More particularly, and without need to be limiting a conventional Edison-base 102 is shown that includes a conductive, threaded metal shell 104 for threaded receipt in an associated lamp socket, and typically includes an electrical eyelet or second contact (not shown) spaced from the threaded shell 104 by insulating material at the lower end of the lamp assembly. This arrangement provides a two lead arrangement for establishing electrical contact associated with the lamp socket in a manner generally known in the art.

At least a portion of the lamp base forms a compartment or inner cavity 106 that receives a power control module 110 such as a ballast mounted on a printed circuit board that allows an AC source to drive the lamp sources or light emitting components of the lamp assembly 100. For example, a ballast is typically enclosed within a portion of compartment 106. Mounted to the lamp base is a first or fluorescent lamp source 112. The illustrated fluorescent lamp source is preferably a spiral configuration or double-helix arrangement that includes first and second legs 114, 116 that have lower portions that extend in substantially parallel relation to a longitudinal axis of the lamp assembly. The legs are disposed adjacent the power control module or ballast in order to provide ease of connection. Intermediate the first and second legs 114, 116, a remainder of discharge tube 118 adopts a generally spiral configuration of the compact fluorescent lamp source. A fill gas is sealed within the discharge tube, and electrodes or cathodes 130, 132 are provided in the respective legs 114, 116, and thus located at opposite ends of an elongated discharge path that extends through the length of the spiral discharge tube. As is known in the art, an arc is initiated between the cathodes and light emitted from the ionized fill is emitted as visible light in a desired color by passing through a phosphor provided on an inner surface of the discharge tube.

A second or incandescent lamp source 140, such as an incandescent or tungsten halogen lamp source having a filament (not shown), is also mounted to the lamp base. In another preferred arrangement, the second lamp source can be a tungsten halogen lamp, for example. As illustrated in FIGS. 1 and 2, the incandescent lamp source is a single ended source that is centrally located within a hollow interior region formed within the spiral portion of the CFL. Particularly, base region or leg 142 of the incandescent lamp source 140 is received in a support 144 that extends from a conventional shield or barrier 150 that separates the compartment of the lamp base that houses the power control module from the light emitting portions of the first and second lamp sources 112, 140. The lamp sources are also preferably housed or enclosed within a common envelope or outer bulb 160. The bulb is dimensioned to enclose the CFL source 112 and the incandescent lamp source 140 within its hollowed, generally spherical portion 162 and the bulb has a reduced dimension as it proceeds for sealed engagement with the lamp base along a necked-down region 164. Preferably, the conventional shield 150 is located within this transition region between the spherical portion 162 and the necked-down region 164 of the bulb and the shield is adapted to protect the heat sensitive components of the power control module 110 from the elevated temperatures associated with operation of the first and second lamp sources 112, 140. A perimeter portion 152 of the shield abuts against the inner surface of the bulb, while selected openings through the barrier permit the electrical connections between the legs of the CFL source 112 and the incandescent lamp source 140 with the power control module.

Figure 3:
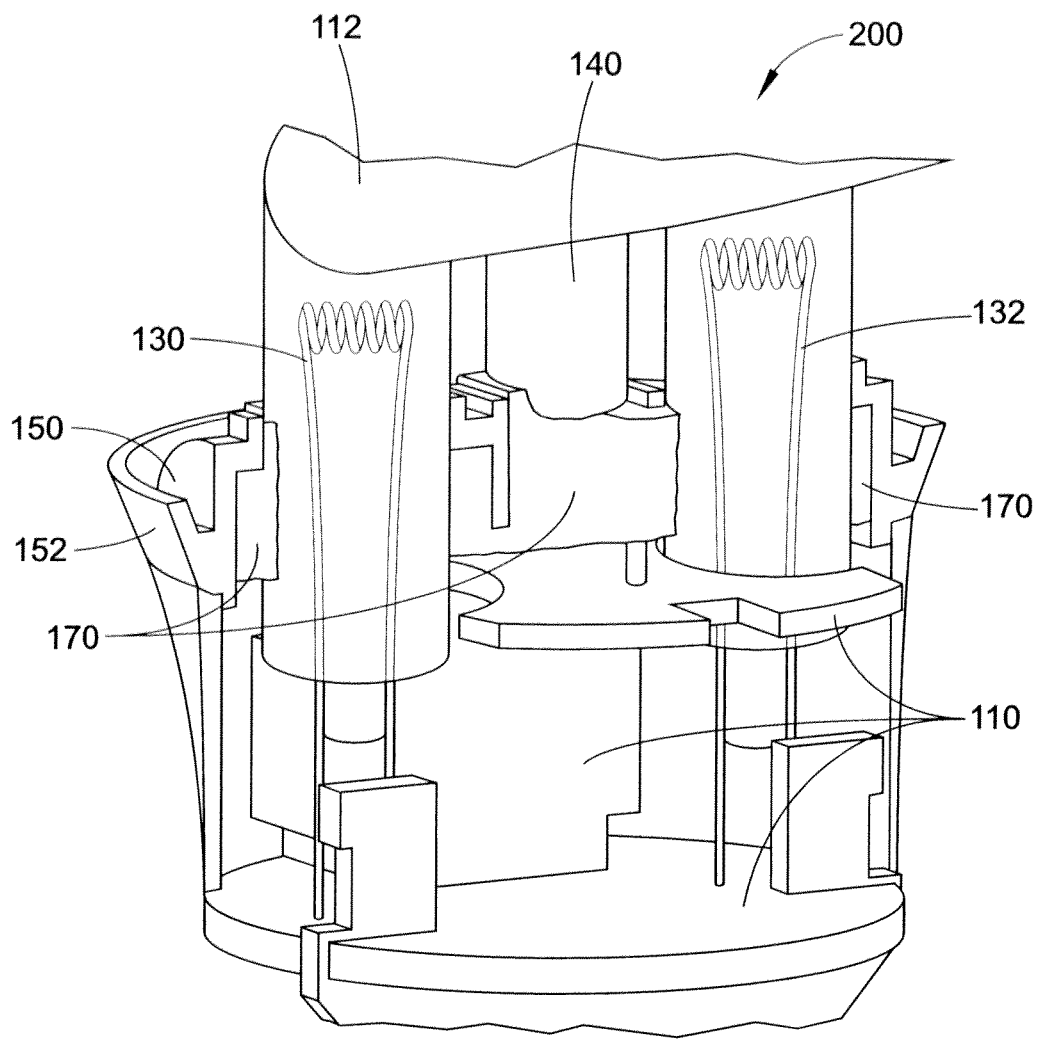
FIG. 3 is an elevational partially exploded view of an exemplary lamp assembly in accordance with the disclosure, having portions thereof removed for clarity.

Turning now to FIGS. 3-7, and initially to FIG. 3, the details of a lamp assembly 200 including an insulative barrier in accordance with the disclosure are illustrated. The lamp assembly 200 is nearly identical to the lamp assembly 100 of FIGS. 1 and 2 and like reference numerals indicate like components. It will be appreciated, however, that aspects of this disclosure are applicable to a wide range of lamp assemblies and not just the lamp assembly illustrated. For clarity, some of the lamp components (e.g, base 102, outer bulb 160, etc.) as seen in FIGS. 1 and 2 have been removed from the lamp assembly 200 of FIG. 3.

FIG. 3 is an enlarged and partially exploded view of the exemplary lamp assembly 200 that, as mentioned, includes an insulative barrier. The insulative barrier is in the form of cement 170 applied between heat sources (e.g., fluorescent lamp source 112 and incandescent lamp source 140) and heat sensitive components (e.g., power control module 110). As will be described in more detail below, the insulative barrier both protects the heat sensitive components of the lamp assembly 200 from exposure to heat generated by the heat sources of the lamp, and acts to fix in place various components of the lamp assembly 200.

With further reference to FIGS. 4 and 5, the top or lamp side of the lamp assembly 200 is shown. In FIG. 4, just a small portion of the cement 170 is evident as it surrounds just the base of the incandescent light source 140. In FIG. 5, which is a partial cross-sectional view taken through the barrier 150 of the lamp assembly 140, the extent of the cement 170 is visible. The cement 170 is supported in, or otherwise bounded by, barrier 150 and fills in and surrounds a base portion of both the fluorescent lamp source 112 and incandescent lamp source 140. In the illustrated embodiment, the cement 170 surrounds a base portion of each of the fluorescent lamp source 112 and incandescent lamp source 140 and thereby fixes said components in place within the lamp assembly 200.

For most applications, the cement 170 may have a thickness of at least 1 mm, and preferably between about 3 mm and 5 mm. Of course, the cement 170 can have any desired thickness depending on the specific application.

Referring to FIGS. 6 and 7, lamp assembly 200 is shown having two different thicknesses or masses of cement 170. In FIG. 6, a smaller mass of cement is utilized. As will be appreciated, less cement may be needed for lower wattage CFL's or CFL's that do not generate much heat.

In FIG. 7, the lamp assembly 200 is illustrated with a larger mass of cement 170. The larger mass of cement will be a more effective insulator than the mass of cement shown in FIG. 6. Accordingly, FIG. 7 may correspond to a higher wattage CFL or a CFL that otherwise generates more heat and thus needs more insulation to protect the ballast from heat exposure.

In practice, the cement will likely be injected into the lamp assembly during manufacture. To this end, lamp parts 112, 140, 150, 172 are fixed in their final position in a temporary or manufacturing holder. The gaps are filled up with cement 170. To stabilize the cement, it is allowed to cure for a per of time. Alternatively, the assembly can be baked in an oven for a certain time.

It will be appreciated that, because the cement is injected into the lamp assembly and takes its final form based on the region on the lamp assembly in which it ultimately resides, the present disclosure may obviate the need to manufacture and/or source various heat resistant parts such as supports, barriers, etc. for different size and/or shape CFLs. Thus, aspects of the present disclosure can reduce costs while providing the needed insulation to protect critical parts and maintain and/or increase the life span of CFL utilizing the cement. In some instances, the holder itself can be omitted from the lamp assembly, with the cement instead functioning as the holder to support the lamp units.

The cement 170 can be any suitable cement. Depending on the application, the thermal insulation properties of the cement could be improved and/or altered by additives such as ceramic or other heat insulating powders dosed into the cement material.

It will be appreciated that the cement provides a simple and relatively inexpensive manner to fix the light sources into the lamp without usage of additional lamp parts and holders. Moreover, cheaper material (e.g., non-heat resistant plastic) can be utilized for the barrier 150 and/or other components of the lamp since the cement 170 will also act to insulate the barrier 150 from the heat sources.

The invention has been described with reference to the preferred embodiments. Obviously, modifications and alterations will occur to others upon reading and understanding the preceding detailed description. It is intended that the invention be construed as including all such modifications and alterations.

What is claimed is:

1. A lamp assembly comprising:
 a lamp base having a compartment;
 a lamp source supported by the lamp base;
 a power control module received in the lamp base compartment and operatively connected to the lamp source; and
 an insulative cement layer surrounding the lamp source and fixing the lamp source to the lamp base, the insulative cement layer extending between the lamp source and the power control module across substantially an entire cross section of the lamp base and having a thickness to insulate the power control module from heat generated by the lamp source.

2. A lamp assembly as set forth in claim 1, further comprising a shield extending between at least a portion of the lamp base and the lamp source.

3. A lamp assembly as set forth in claim 2, wherein the insulative cement layer is in contact with said shield.

4. A lamp assembly as set forth in claim 2, wherein the insulative cement layer is supported by the shield.

5. A lamp assembly as set forth in claim 1, wherein the insulative cement layer includes at least one of polymer with organic and inorganic additives.

6. A lamp assembly as set forth in claim 1, wherein the insulative cement layer includes an amount of heat-resistant material combined with ceramic powders for increasing the insulative properties of the cement layer.

7. A lamp assembly as set forth in claim 1, wherein the insulative cement layer has a thickness between about 1 mm and 10 mm.

8. A lamp assembly as set forth in claim 7, wherein the thickness of the insulative cement layer is approximately 3 mm.

9. A lamp assembly as set forth in claim 8, wherein the lamp source includes a fluorescent lamp source.

10. A lamp assembly as set forth in claim 9, further comprising an incandescent lamp source mounted to the lamp base and disposed adjacent to the fluorescent lamp.

11. The lamp assembly of claim 1 wherein the lamp base includes a threaded region for associated receipt in an associated threaded lamp socket.

12. A method of assembling a lamp comprising:
 providing a lamp base;
 mounting a fluorescent lamp source to the lamp base;
 positioning an incandescent lamp source adjacent the fluorescent lamp source;
 connecting the fluorescent lamp source and the incandescent lamp source to a power control module for selectively terminating power to the incandescent lamp source; and
 flowing an insulative layer of cement between the lamp sources and the power control module for fixing the lamp sources in place and across substantially an entire cross section of the lamp base and at a thickness insulating the power control module from heat generated by the lamp sources.

13. The method of claim 12, further comprising separating the power control module from the lamp sources with a barrier wall.

14. The method of claim 13, wherein the separating step includes allowing legs of the lamp sources to extend through the barrier wall and insulative cement layer for connection with the power control module.

* * * * *